(12) United States Patent
Shukla et al.

(10) Patent No.: US 12,124,705 B2
(45) Date of Patent: Oct. 22, 2024

(54) MEMORY OPERATION BASED ON BLOCK-ASSOCIATED TEMPERATURE

(71) Applicant: Micron Technology, Inc., Boise, ID (US)

(72) Inventors: Pitamber Shukla, Boise, ID (US); Ching-Huang Lu, Fremont, CA (US); Devin Batutis, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 17/848,061

(22) Filed: Jun. 23, 2022

(65) Prior Publication Data

US 2023/0418475 A1   Dec. 28, 2023

(51) Int. Cl.
*G06F 3/06* (2006.01)
*G06F 11/00* (2006.01)
*G06F 11/07* (2006.01)

(52) U.S. Cl.
CPC .......... *G06F 3/0619* (2013.01); *G06F 3/0608* (2013.01); *G06F 3/064* (2013.01); *G06F 3/0659* (2013.01); *G06F 3/0679* (2013.01); *G06F 11/002* (2013.01); *G06F 11/076* (2013.01)

(58) Field of Classification Search
CPC ...... G06F 3/0679; G06F 3/0659; G06F 3/064; G06F 3/0619; G06F 3/0608; G06F 11/002; G06F 11/076; G06F 3/061; G06F 3/0649; G06F 3/0656
USPC ........................................................ 711/127
See application file for complete search history.

(56) References Cited

U.S. PATENT DOCUMENTS

| | | | |
|---|---|---|---|
| 2017/0060764 A1* | 3/2017 | Shetty .................. | G06F 12/126 |
| 2022/0206920 A1* | 6/2022 | Bhat ..................... | G06F 1/3275 |
| 2022/0229580 A1* | 7/2022 | Palmer ................. | G06F 3/0653 |

* cited by examiner

*Primary Examiner* — Hua J Song
(74) *Attorney, Agent, or Firm* — Schwegman Lundberg & Woessner, P.A.

(57) ABSTRACT

Various embodiments provide for performing a memory operation, such as a memory block compaction operation or block folding or refresh operation, based on a temperature associated with a memory block of a memory device. For instance, some embodiments provide for techniques that can cause performance of a block compaction operation on a memory block at a temperature that is at least at or higher than a predetermined temperature value. Additionally, some embodiments provide for techniques that can cause performance of a block folding/refresh operation, at a temperature that is at or higher than the predetermined temperature value, on one or more blocks on which data was written at a temperature lower than the predetermined temperature value.

20 Claims, 5 Drawing Sheets

MEMORY OPERATION BASED ON BLOCK-ASSOCIATED TEMPERATURE

TECHNICAL FIELD

Embodiments of the disclosure relate generally to memory devices and, more specifically, to performing a memory operation, such as a memory block compaction or a memory block folding, based on a temperature associated with the memory block, which can be performed by a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
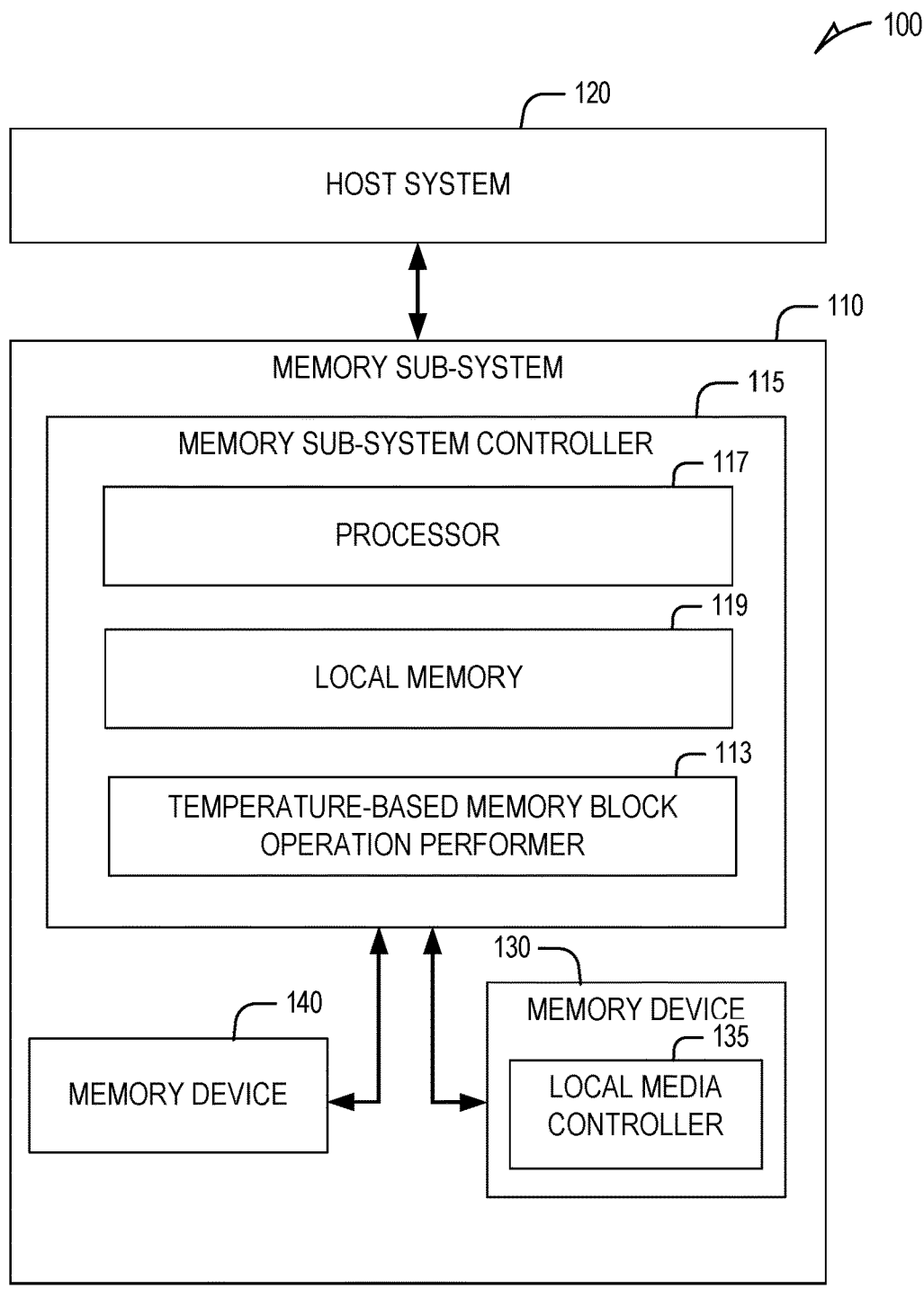
FIG. 1 is a block diagram illustrating an example computing system that includes a memory sub-system, in accordance with some embodiments of the present disclosure.

Aspects of the present disclosure are directed to performing a memory operation, such as a memory block compaction operation or a memory block folding or refresh operation, based on a temperature associated with a block of a memory device, which can be performed by a memory sub-system. A memory block compaction operation can copy data stored on the cache blocks to one or more non-cache blocks at another time to facilitate higher storage capacity on the memory device A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system.

A memory device can be a non-volatile memory device. A non-volatile memory device is a package of one or more die. Each die can be comprised of one or more planes. For some types of non-volatile memory devices (e.g., NOT-AND (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Certain memory devices, such as NAND-type memory devices, comprise one or more blocks, (e.g., multiple blocks) with each of those blocks comprising multiple memory cells. For instance, a memory device can comprise multiple pages (also referred as wordlines), with each page comprising a subset of memory cells of the memory device. A memory device can comprise one or more cache blocks and one or more non-cache blocks, where data written to the memory device is first written to one or more cache blocks, which can facilitate faster write performance; data stored on the cache blocks can eventually be moved (e.g., copied) to one or more non-cache blocks at another time (e.g., performing a block compaction operation at a time when the memory device is idle), which can facilitate higher storage capacity on the memory device. A non-cache block can comprise a single-level cell (SLC) block that comprises multiple SLCs, and a cache block can comprise a multi-level cell (MLC) block that comprises multiple MLCs, a triple-level cell (TLC) block that comprise multiple TLCs, or a quad-level cell (QLC) block that comprises QLCs. Writing first to one or more SLCs blocks can be referred to as SLC write caching. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

In conventional memory devices and memory sub-systems, programming data to a quad-level cell (QLC) of a memory device at temperature that is lower than a certain temperature value (e.g., suggested, or standard operating temperature) can result in less than desirable setup and subsequent high temperature data retention (HTDR) valley margins for the QLC. Worse valley margins at setup can impact a memory device or a memory sub-system's read performance with respect to Trigger Rate (TR) (which indicates how often a read operation fails), and worse valley margins after HTDR can impact NAND cell reliability.

Aspects of the present disclosure address the above and other deficiencies by performing a memory operation, such as a memory block compaction operation (hereafter, block compaction operation) or block folding or refresh operation (hereafter, block folding operation), based on a temperature associated with a memory block of a memory device (e.g., temperature of the memory device, or temperature of a memory sub-system including the memory device). In particular, some embodiments described herein provide for techniques (e.g., algorithms) that can cause performance of a block compaction operation (e.g., single-level cell block-quad-level cell block (SLC-QLC) block compaction operation) on a memory block at a temperature that is at least at or higher than a predetermined temperature value (e.g., suggested or standard operating temperature, which can serve as a temperature threshold value). Additionally, some embodiments described herein provide for techniques that can cause performance of a block folding or refresh operation, at a temperature that is at or higher than a predetermined temperature value, on one or more blocks on which data was written at a temperature lower than the predetermined temperature value.

According to some embodiments, a compaction operation is performed with respect to a cache block (containing one or more memory cells) of a memory device (e.g., NAND-type memory device) based on a temperature associated with the cache block (e.g., temperature of the memory device), where the temperature (e.g., sample temperature) is obtained while data (e.g., host data) is being written to the cache block. In this way, various embodiments implement a temperature-dependent block compaction operation. For various embodiments, if the block compaction operation is performed on the block at a temperature (associated with the block) that is lower than a temperature threshold value (e.g., a suggested temperature), then eventually a block folding operation will be performed on the block at least at or above the temperature threshold value (e.g., eventually performing the block folding operation when the temperature of the block is at least at or above the temperature threshold value). Additionally, for some embodiments, if the block compaction operation is performed on the block at a temperature that is lower than a temperature threshold value, then a block folding operation is performed on the block at least at or above the temperature threshold value if the block satisfies a read bit error rate (RBER) criterion (e.g., a RBER criterion that indicates that the block is nearing failure when satisfied). For example, the RBER criterion can include 6E-3/2k (boundary for trigger rate (TR) pass/fail)-Δ, where Δ is a guard band to avoid TR fail. The RBER criterion can vary for other examples.

For some embodiments, a temperature (e.g., temperature value) is obtained while data is being written to a block (e.g., a cache block) of a memory device, and information regarding the temperature (e.g., the temperature value) can be stored on the memory device. For instance, while data is being written to a block of a memory device, a temperature (e.g., temperature value) associated with the block can be obtained, and the obtained temperature can be stored in (e.g., added to) metadata that is stored on the block (e.g., metadata stored directly on a first page of a NAND block stripe). Depending on the embodiment, a later scan can be used to identify (e.g., check) blocks that are storing information that indicates that a data write operation occurred at a temperature below a temperature threshold value (e.g., a threshold temperature criterion). This scan results in a binary flag being generated for each identified block, and that binary flag can be stored in a data structure (e.g., a table for storing all binary flags) that is separate from the block. In this way, the blocks flagged (e.g., in the table) can represent those blocks (e.g., cache blocks of the memory device) that are written to at a temperature below a threshold temperature criterion, and that can benefit from performance of a block folding/refresh operation (e.g., performance as a background operation) at a temperature that is at least at or above the threshold temperature criterion. For example, performing a block folding/refresh operation on a block (e.g., cache block) at the higher temperature can improve the subsequent HTDR margin for TR and reliability improvement.

Eventually, when a temperature associated with an identified/flagged block (e.g., temperature of the memory device or memory sub-system) is a temperature threshold value (e.g., the threshold temperature criterion), a block fold operation can be performed on the identified/flagged block (e.g., and one or more of the other identified/flagged blocks).

For some embodiments, a block fold operation is performed on an identified/flagged block when a temperature associated with the identified/flagged block (e.g., temperature of the memory device or memory sub-system) is above a temperature threshold value, and one or more other criteria are satisfied. For example, the one or more other criteria can include a read bit error rate (RBER) criterion. In various embodiments, when a block (e.g., cache block) satisfies a RBER criterion, the block can be nearing failure. An example RBER criterion can comprise a read count threshold value, where if a current value of a read count of a block (e.g., indicating the number of times data has been read from the block) is greater than the read count threshold value, the RBER criterion is satisfied.

If, based on a temperature associated with a memory cell of a block, a memory cell compaction is performed on the memory cell at a temperature that is lower than a predetermined temperature value (e.g., a suggested temperature or expected operating temperature), then eventually a block folding operation (e.g., QLC block folding operation) is performed on the block in response to the block satisfying one or more criteria, which can include a read bit error rate-based (RBER-based) criterion. For example, the RBER-based criterion can be such that when satisfied by a block, indicates that the block is nearing a failure criterion (e.g., for TR or reliability). The RBER-based criterion can comprise, for instance, a boundary value (e.g., threshold value) for TR pass/fail determined by the following Formula 1:

$$6E^{-3}/2k-\Delta,$$

where Δ represents a guard band to avoid TR failure.

Use of various embodiments reduces quick charge loss (QLC) or short-term data retention (STDR) for blocks, such as blocks with low setup temperatures. Additionally, use of various embodiments can improve trigger rate (TR) read performance, read performance, reliability (e.g., overall intrinsic NAND memory cell reliability or block reliability), and overall quality of service (QoS) of one or more memory devices, which can form part of a memory sub-system. For example, use of an embodiment can avoid the low temperature setup (e.g., block program) condition, which in turn can reduce detrapping (e.g., QLC detrapping) after programming, improves overall memory cell reliability (e.g., intrinsic NAND memory cell reliability) and TR.

As used herein, a block compaction operation is performed on a cache block and can comprise reading data stored on the cache block and writing the read data to a non-cache block (e.g., programming the non-cache block with the data read from the cache block), thereby copying the data from the cache block to the non-cache block. An example cache block can include a SLC block, and an example non-cache block can include a MLC, TLC, or QLC block. Additionally, an example block compaction operation can include a SLC-QLC block compaction operation. A block compaction operation can be performed, for instance, when available cache blocks on a memory device are full or nearing a fill limit.

As used herein, a block folding or refresh operation is performed on a block, such as a non-cache block (e.g., QLC block), and can comprise reading data stored on a first block and writing the read data to a second block (e.g., programming the second block with the data read from the first block), where the first block and the second block are usually of the same type. For instance, a block folding can be performed on a first QLC block, and result in the data stored on the first QLC clock to be copied to a second QLC block. A block folding/refresh operation can be performed on a selected block when the selected block is experiencing errors or failure, or nearing a failure limit (e.g., when the number of times data stored on the selected block has been read exceeds a read count threshold value).

Disclosed herein are some examples of performing a memory operation, such as a block compaction operation or block folding operation, based on a temperature associated with a memory block of a memory device, which can be performed by a memory sub-system as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NOT-AND (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLCs), can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

As used herein, a block comprising SLCs can be referred to as an SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a temperature-based memory block operation performer 113 that implements performance of a memory operation (e.g., a block compaction operation or a block folding or refresh operation) on a block of one memory devices 130,140 based on a temperature associated with the block (e.g., temperature of one of the memory devices 130, 140). According to some embodiments, the memory sub-system controller 115 receives, from the host system 120, a request to write host data. Depending on the embodiment, the request can specify one of the memory devices 130, 140, or can comprise a general request to write the host data to the memory sub-system 110.

For some embodiments, the memory sub-system 110 is configured to write data first to one or more cache blocks (e.g., comprising SLC blocks) of the memory devices 130, 140 to facilitate fast write speeds, and eventually copy data written to the one or more cache blocks from those cache blocks to one or more non-cache blocks. Compared to cache blocks, non-cache blocks can be implemented using memory cells (e.g., MLCs, TLCs, QLCs) that provide higher storage density per memory cell but that provide slower write speed than memory cells (e.g., SLCs) that implement cache blocks.

While at least of portion of the host data is being written to at least one cache block of the memory device 130 or the memory device 140, the temperature-based memory block operation performer 113 causes the memory sub-system controller 115 to determine a sample temperature associated with the at least one cache block. For instance, the sample temperature can be the temperature of one of the memory devices 130, 140 or the memory sub-system 110. Eventually, the memory sub-system controller 115 can determine whether to perform block compaction operation on the at least one cache block, where the block compaction operation can copy stored data from the at least one cache block to the at least one cache block. Prior to performing the block compaction operation on the at least one cache block, the temperature-based memory block operation performer 113 causes the memory sub-system controller 115 to determine whether the sample temperature is above a temperature threshold value. Depending on the embodiment, the temperature threshold value can be associated with the memory sub-system 110, associated with the memory device 130 or the memory device 140 on which the at least one cache block resides, or associated with the at least one cache block. For instance, the temperature threshold value can be determined based on a set of operational characteristics of the memory sub-system 110, the memory device 130, or the memory device 140. In various embodiments, the temperature threshold value is updated (e.g., periodically) based on active monitoring of the set of operational characteristics of the memory sub-system 110, the memory device 130, or the memory device 140. In response to determining that the sample temperature is above the temperature threshold value, the temperature-based memory block operation performer 113 causes the memory sub-system controller 115 to perform the block compaction operation on the at least one cache block.

In response to determining that the temperature is not above the temperature threshold value, the temperature-based memory block operation performer 113 causes the memory sub-system controller 115 to determining whether to defer performance of the block compaction operation on the at least one cache block. For instance, determining whether the block compaction operation can be deferred based on whether there are any cache blocks available to write to on the memory sub-system 110 (e.g., for any subsequent write requests from the host system 120). For example, for some embodiments, when there are no cache blocks are available to write to, the block compaction operation cannot be deferred.

In response to determining to not defer performance of the block compaction operation on the at least one cache block, the temperature-based memory block operation performer 113 causes the memory sub-system controller 115 to perform the block compaction operation on the at least one cache block, whereby the stored data on the at least one cache block is copied from the at least one cache block to the at least one non-cache block. It is presumed that because the sample temperature is not above the temperature threshold value, the block compaction operation is performed on the at least one cache block at a temperature below the temperature threshold value and, therefore, the at least one non-cache block receiving data from the at least one cache block is being written to (e.g., programmed) at a temperature below the temperature threshold value. Accordingly, the temperature-based memory block operation performer 113 causes the memory sub-system controller 115 to mark (e.g., in a table) the at least one non-cache block for performance of a block folding operation at least at or above a predetermined temperature (e.g., performance in the future when the memory device 130, the memory device 140, or the memory sub-system 110 is at or above the predetermined temperature). For some embodiments, the predetermined temperature is at or above the temperature threshold value. For some embodiments, the temperature at which the block compaction operation is performed is stored as information (e.g., as part of metadata) in the at least one non-cache block (e.g., the QLC block) receiving the stored data from the at least one cache block (e.g., information regarding QLC programming temperature is stored in the QLC block).

Eventually, the temperature-based memory block operation performer 113 causes the memory sub-system controller 115 to scan for one or more non-cache blocks that are marked for performance of a block folding operation at least at or above a predetermined temperature. For example, the memory sub-system controller 115 can determine whether the at least one non-cache block is marked. Where a non-cache block is marked, the temperature-based memory block operation performer 113 causes the memory sub-system controller 115 to determine whether the non-cache block satisfies a set of block folding criteria, which can include a read bit error rate (RBER)-based criterion that when satisfied, indicates that the non-cache block is nearing a failure condition for TR or reliability. For some embodiments, information regarding whether the RBER of the non-cache block is nearing a failing criteria is stored in (e.g., the metadata of) the non-cache block. Where a non-cache block is marked and satisfies the set of block folding criteria, the temperature-based memory block operation performer 113 causes the memory sub-system controller 115 to perform the block folding operation on the non-cache block at a temperature that is at least at or above the predetermined temperature. In doing so, the subsequent HTDR margin for TR and reliability can be improved for the non-cache block can be improved. Additionally, this methodology can also improve the time-0 read window budget (RWB).

For some embodiments, information (e.g., binary information) stored in (e.g., the metadata of) a non-cache block includes a temperature at which the non-cache block is programmed during a block compaction operation, or if the RBER of the non-cache block is nearing a failing criteria for TR or reliability. The temperature-based memory block operation performer 113 causes the memory sub-system controller 115 to scan to identify (e.g., check for) non-cache blocks that have stored write temperature that are below a threshold criteria (e.g., the threshold temperature value). If so, the temperature-based memory block operation performer 113 causes the memory sub-system controller 115 to generate a binary flag, which can be stored in a table. Eventually, when a temperature (e.g., of the memory device 130, the memory device 140, or the memory sub-system 110) is above the threshold temperature value, the temperature-based memory block operation performer 113 causes the memory sub-system controller 115 to check the table to identify those non-cache blocks on which the block folding operation is to be performed.

Figure 2:
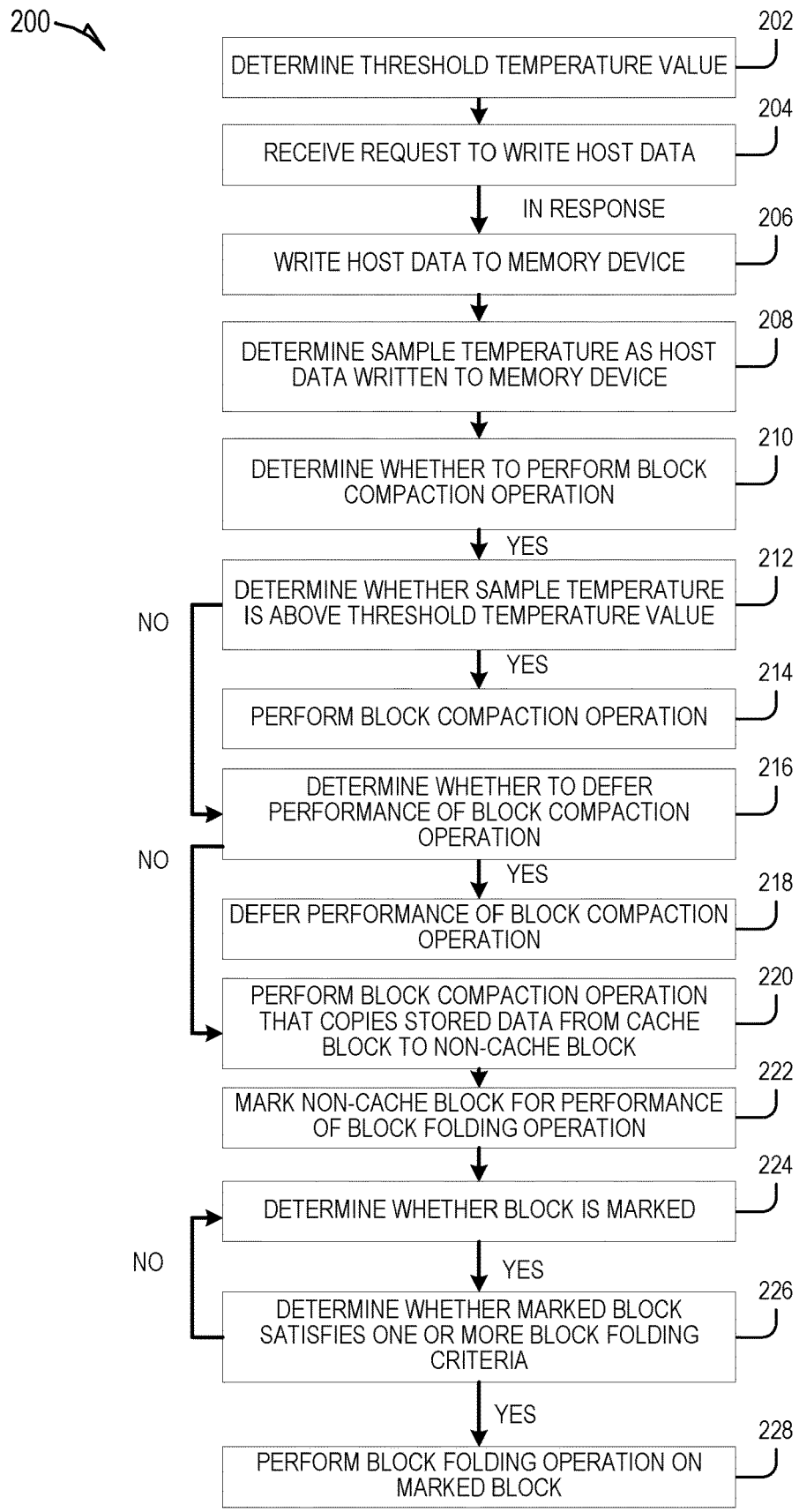
FIGS. 2 and 3 are flow diagrams of example methods for performing a memory operation based on a temperature associated with a block of a memory device, in accordance with some embodiments of the present disclosure.
Figure 3:
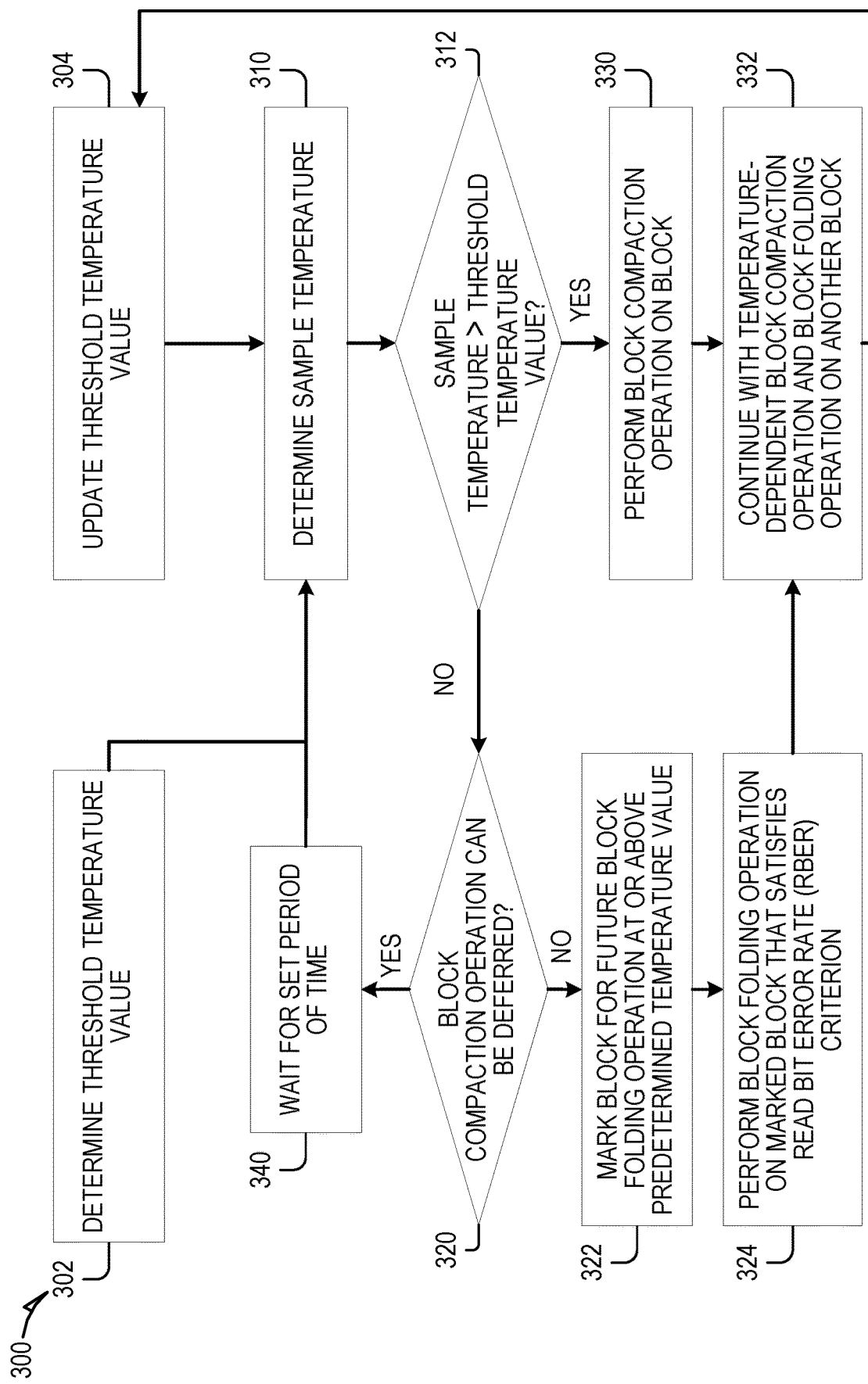

FIGS. 2 and 3 are flow diagrams of example methods for performing a memory operation (such as a memory block compaction operation or a memory block folding or refresh operation) based on a temperature associated with a block of a memory device, in accordance with some embodiments of the present disclosure. The methods 200, 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of the methods 200 or 300 are performed by the memory sub-system controller 115 of FIG. 1 based on the temperature-based memory block operation performer 113. Additionally, or alternatively, for some embodiments, at least one of the methods 200, 300 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 200 of FIG. 2, at operation 202, the processing device (e.g., the processor 117 of the memory sub-system controller 115) determine (e.g., generate) a threshold temperature value for use by the method 200. Depending on the embodiment, operation 202 can be performed (or invoked) by a manufacturer of the memory device 130, 140 or the memory sub-system 110 prior to the memory sub-system 110 shipping to an end-user (e.g., customer), or by the end-user after he or she receives the memory sub-system 110. For some embodiments, the threshold temperature value is determined based on a set of operational characteristics of a memory device (e.g., 130, 140) or a memory sub-system (e.g., 110) with which the method 200 is being used. Additionally, the threshold temperature value can be determined based on one or more predetermined device characteristics, such as a static threshold temperature criterion. For some embodiments, during operation of the memory device or the memory sub-system, a set of current operating characteristics is monitored (e.g., recorded) and the temperature threshold value is updated (e.g., adapted or adjusted) based on the set of current operating characteristics. The update can comprise using (e.g., applying) statistics on the set of current operating characteristics (e.g., as recorded). The update can be periodic or invoked upon satisfaction of one or more criteria that indicate when an update should be performed or is needed.

At operation 204, the processing device (e.g., 117) receives, from a host system (e.g., 120), a request to write host data. The request can comprise a request to write the host data on a memory sub-system (e.g., 110), or a request to write at least a portion of the host data specifically on one or more memory devices (e.g., 130, 140).

In response to the request, at operation 206, the processing device (e.g., 117) writes the host data to one or more cache blocks (e.g., programs the one or more cache blocks with the host data), where the one or more cache blocks are part of at least one memory device (e.g., memory device 130 or 140 of the memory sub-system 110). For example, during operation 206, the processing device writes the host data to one or more SLC blocks that are serving as cache blocks. While at least a portion of the host data is being written to the one or more cache blocks, at operation 208, the processing device (e.g., 117) determines (e.g., obtains or samples) a sample temperature associated with the one or more cache blocks. For example, the sample temperature can comprise a current or instantaneous temperature of a memory device (e.g., 130, 140) that includes the one or more cache blocks, or the current or instantaneous temperature (e.g., instantaneous operating temperature) of the memory sub-system (e.g., 110) that includes the memory device.

Eventually, at operation 210, the processing device (e.g., 117) determines (e.g., evaluates) whether to perform block compaction operation on the one or more cache blocks. For some embodiments, the block compaction operation comprises copying stored data from the one or more cache blocks to one or more non-cache blocks, where the one or more non-cache blocks are part of at least one memory device (e.g., same memory device as that of the one or more cache blocks). Operation 210 can be performed periodically or when one or more criteria are satisfied for evaluating whether the block compaction operation should be performed.

Where the processing device (e.g., 117) determines to perform block compaction operation on the one or more cache blocks, prior to performing the block compaction operation on the one or more cache blocks, operation 212 is performed. At operation 212, the processing device (e.g., 117) determines whether the sample temperature (determined by operation 208) is above the temperature threshold value (e.g., determined by operation 202). In response to the processing device (e.g., 117) determining that the sample temperature is above the temperature threshold value, at operation 214, the processing device performs (or causes the performance of) the block compaction operation on the one or more cache blocks.

In response to the processing device (e.g., 117) determining that the sample temperature is not above the temperature threshold value, at operation 216, the processing device determines whether to defer performance of the block compaction operation on the one or more cache blocks. For some embodiments, operation 216 comprises the processing device determining whether cache blocks of the memory device (e.g., 130, 140) or the memory sub-system (e.g., 110) satisfy a full cache criterion, which when satisfied can indicate that the cache blocks are full or no cache blocks are currently available for additional data writes.

In response to the processing device (e.g., 117) determining to defer performance of the block compaction operation on the one or more cache blocks, the processing device defers performance of the block compaction operation at operation 218. For instance, operation 218 can defer performance of the block compaction operation on the one or more cache blocks to another time (e.g., after a predetermined delay), when a sample temperature (e.g., of the memory device 130 or 140 or the memory sub-system 110) may be above the temperature threshold value.

In response to the processing device (e.g., 117) determining to not defer performance of the block compaction operation on the one or more cache blocks, at operation 220, the processing device performs the block compaction operation on the one or more cache blocks, where the block compaction operation copies stored data from the one or more cache blocks to one or more non-cache blocks (e.g., of the memory sub-system 110 and, more specifically, the same memory device on which the one or more cache blocks reside). Additionally, at operation 222, the processing device (e.g., 117) marks the one or more cache blocks for (e.g., future) performance of a block folding operation at least at or above a predetermined temperature (e.g., when the temperature of the memory device 130 or 140 or the memory sub-system 110 is at or above the predetermined temperature). For instance, the processing device (e.g., 117) can mark the one or more cache blocks by storing information in (e.g., the metadata of) the individual cache blocks, or by marking the one or more cache blocks in a table, which can be stored on persistent or non-persistent memory of a memory sub-system (e.g., the local memory 119 of the memory sub-system controller 115). For some embodiments, the predetermined temperature is equal to or greater than the temperature threshold value. For some embodiments, operation 222 comprises the processing device determining a compaction temperature at which the block compaction operation on the one or more non-cache blocks is performed (at operation 220), and storing information describing the compaction temperature with respect to the one or more non-cache blocks (to which stored data was copied from the one or more cache blocks). The compaction temperature can represent a temperature associated with the one or more non-cache blocks when the stored data is written to the one or more non-cache blocks (e.g., when the one or more non-cache blocks, such as QLC blocks, are programmed with the stored data).

Thereafter, operation 224 can be performed during a scan of one or more blocks. At operation 224, the processing device (e.g., 117) determines whether the one or more non-cache blocks are marked for the block folding operation to be performed at or above the predetermined temperature. In response to the processing device determining that the one or more non-cache blocks are marked for the block folding operation, at operation 226, the processing device determines whether the one or more cache blocks satisfy one or more block folding criteria. For instance, the one or more block folding criteria can include a read bit error rate (RBER)-based criterion, which when satisfied by the one or more non-cache blocks, indicate that the one or more non-cache blocks are nearing failure (e.g., TR or reliability failing). The RBER-based criterion can comprise a read count threshold, and a non-cache block can satisfy the RBER-based criterion when a read count of the non-cache block (e.g., number of times data has been read from the block) surpasses the read count threshold. Additionally, the one or more block folding criteria can include the temperature associated with the one or more non-cache blocks (e.g., temperature of the memory devices 130, 140 or the memory sub-system 110) being at or above the predetermined temperature, thereby which can ensure that block folding operation is performed at a temperature that is higher than the threshold temperature value.

In response to the processing device (e.g., 117) determining that the one or more block folding criteria are satisfied, at operation 228, the processing device performs the block folding operation on the one or more non-cache blocks. Alternatively, in response to the processing device determining that the one or more block folding criteria are not satisfied, the method 200 can return to operation 224 or wait until the one or more block folding criteria are satisfied.

Referring now to the method 300 of FIG. 3, the method 300 illustrates an example implementation of the method 200 of FIG. 2. At operation 302, a threshold temperature value is determined (e.g., generated) based on one or more known operating characteristics of a memory device that comprises blocks, which include one or more cache blocks and one or more non-cache blocks. Alternatively, or additionally, at operation 304, one or more operating characteristics of the memory device are monitored (e.g., recorded) and based on statistics of the monitored characteristics, predetermined knowledge of the memory device, or both, the threshold temperature value can bet updated (e.g., adapted or adjusted). After operation 302 or operation 304, at operation 310, while at least a portion of host data is being written to a cache block, a sample temperature associated with the cache block is determined. For instance, the sample temperature can comprise an instantaneous operating temperature of a memory device that includes the cache block or of a memory sub-system that includes the memory device. The sample temperature determined at operation 310 is used by operation 312.

At operation 312, the sample temperature is compared to a threshold temperature value (e.g., associated with the memory device or the memory sub-system). If the sample temperature is above (e.g., greater than) the threshold temperature value, a block compaction operation is performed on the cache block at operation 330, where stored data is copied from the cache block to a non-cache block. After operation 330, the method 300 proceeds to operation 332.

If the sample temperature is not above (e.g., less than or equal to) the threshold temperature value, the method 300 proceeds to operation 320. At operation 320, it is determined whether performance of the block compaction operation on the cache block can be deferred. If it is determined that performance of the block compaction operation on the cache block can be deferred, at operation 340, the method 300 waits for a set period of time (e.g., a predetermined time delay) before trying to perform the block compaction operation on the cache block again.

If it is determined that performance of the block compaction operation on the cache block cannot be deferred, the block compaction operation is performed on the cache block (where stored data is copied from the cache block to a non-cache block) and, at operation 322, the non-cache block is marked for future performance of a block folding operation at or above a predetermined temperature value. Eventually, when the instantaneous operating temperature associated with the marked non-cache block is at or above the predetermined temperature value, at operation 324, the block folding operation is performed on the marked non-cache block when the marked non-cache block satisfies a RBER criteria (e.g., Formula 1. After operation 324, the method 300 proceeds to operation 332.

At operation 332, method 300 continues with performing temperature-based block compaction operation on another cache block or block folding operation on another non-cache block. After operation 332, the method 300 proceeds (e.g., returns) to operation 304.

Figure 4:
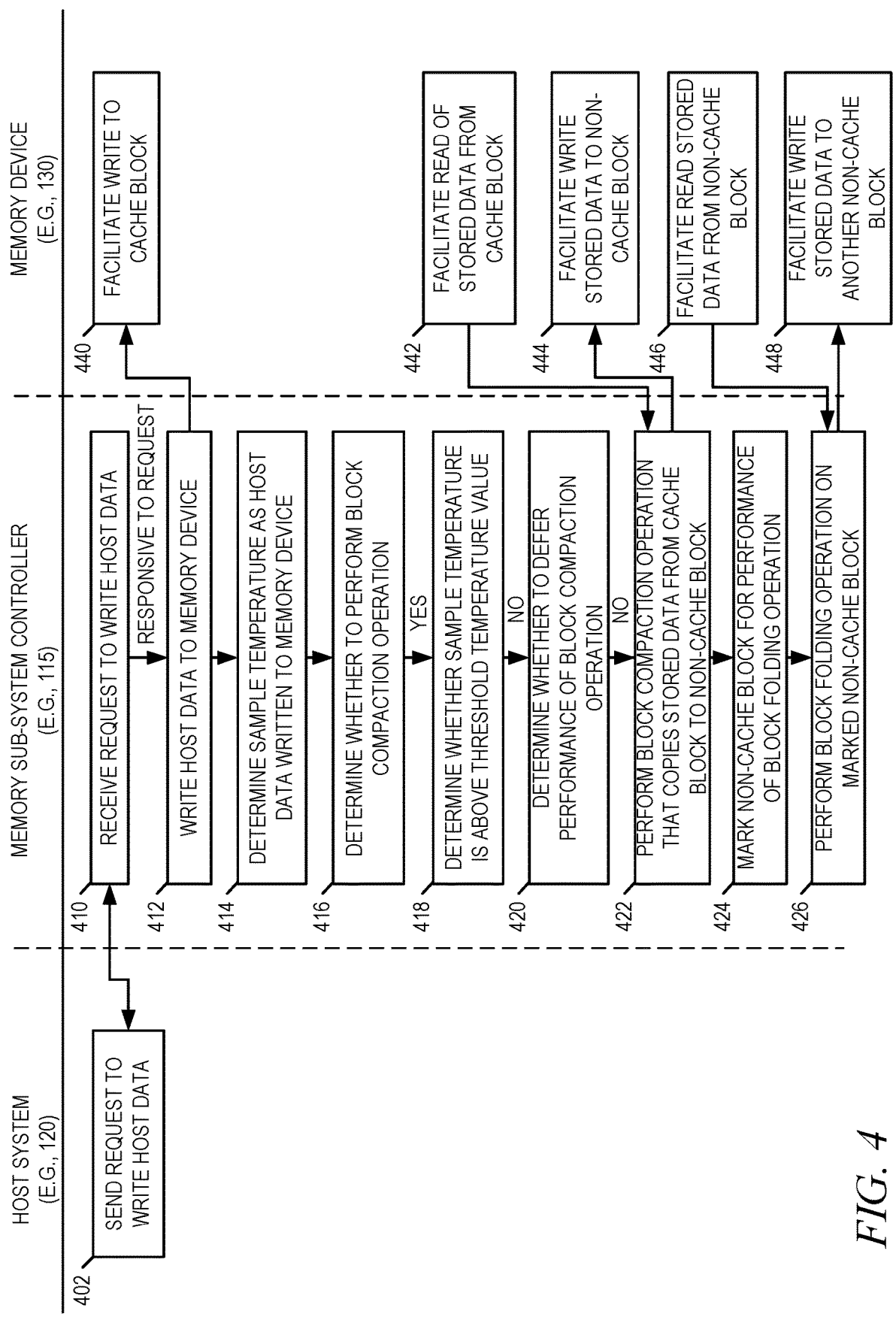
FIG. 4 provides an interaction diagram illustrating interactions between components of a computing environment in the context of some embodiments in which a method that performs a memory operation based on a temperature associated with a block of a memory device as described herein is performed.

FIG. 4 provides an interaction diagram illustrating interactions between components of a computing environment in the context of some embodiments in which a method that performs a memory operation based on a temperature associated with a block of a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order; some processes can be performed in parallel. Additionally, one or more processes can be omitted in various embodiments. Thus, not all processes are used in every embodiment. In the context of the example illustrated in FIG. 4, the host system can include the host system 120, the memory sub-system controller can include the memory sub-system controller 115, and the memory device can include the memory device 130.

As shown in FIG. 4, at operation 402, the host system 120 sends, to the memory sub-system 110, a request to write host data to the memory sub-system 110. At operation 410, the memory sub-system controller 115 receives the request to write the host data on the memory sub-system 110 and, in response, the memory sub-system controller 115 causes at least a portion of the host data to be written to (e.g., programmed on) a cache block of the memory device 130 at operation 412. The memory device 130 facilitates the writing (e.g., programming) of the portion of the host data to the cache block at operation 440.

At operation 414, the memory sub-system controller 115 determines (e.g., obtains) a sample temperature associated with the cache block. Additionally, at operation 416, the memory sub-system controller 115 determines whether to perform the block compaction operation. Where the memory sub-system controller 115 determines to perform the block compaction operation, at operation 418, the memory sub-system controller 115 determines whether the sample temperature is above a threshold temperature value. Where the memory sub-system controller 115 determines that the sample temperature is above the threshold temperature value, the memory sub-system controller 115 performs or causes performance of the block compaction operation on the cache block.

Alternatively, where the memory sub-system controller 115 determines that the sample temperature is not above the threshold temperature value, the memory sub-system controller 115 determines whether to defer performance of the block compaction operation on the cache block at operation 420. In response to the memory sub-system controller 115 determining to defer performance of the block compaction operation on the cache block, the memory sub-system controller 115 can defer performance of the block compaction operation by a predetermined time delay. In response to the memory sub-system controller 115 determining to not defer performance of the block compaction operation on the cache block, the memory sub-system controller 115 performs or causes performance of the block compaction operation on the cache block at operation 422. During the block compaction operation, the memory sub-system controller 115 reads stored data from the cache block of the memory device 130 and writes the read stored data to a non-cache block of the memory device 130, thereby copying the stored data from the cache block to the non-cache block. The memory device 130 facilitates the reading of the stored data from the cache block at operation 442, and facilitates the writing of the stored data (read from the cache block) to the non-cache block (e.g., programming of the non-cache block with the stored data) at operation 444.

After operation 422, at operation 424, the memory sub-system controller 115 marks the non-cache block for (e.g., future) performance of a block folding operation. Eventually, at operation 426, the memory sub-system controller 115 performs or causes the performance of the block folding operation on the marked non-cache block (e.g., when one or more block folding criteria are satisfied by the non-cache block, which can include a RBER criterion). During the block folding operation, the memory sub-system controller 115 reads stored data from the non-cache block (e.g., QLC block) of the memory device 130 and writes the read stored data to another non-cache block (e.g., another QLC block) of the memory device 130, thereby copying the stored data from the non-cache block to the other non-cache block. The memory device 130 facilitates the reading of the stored data from the non-cache block at operation 446, and facilitates the writing of the stored data (read from the non-cache block) to the other non-cache block (e.g., programming of the other non-cache block with the stored data) at operation 448.

Figure 5:
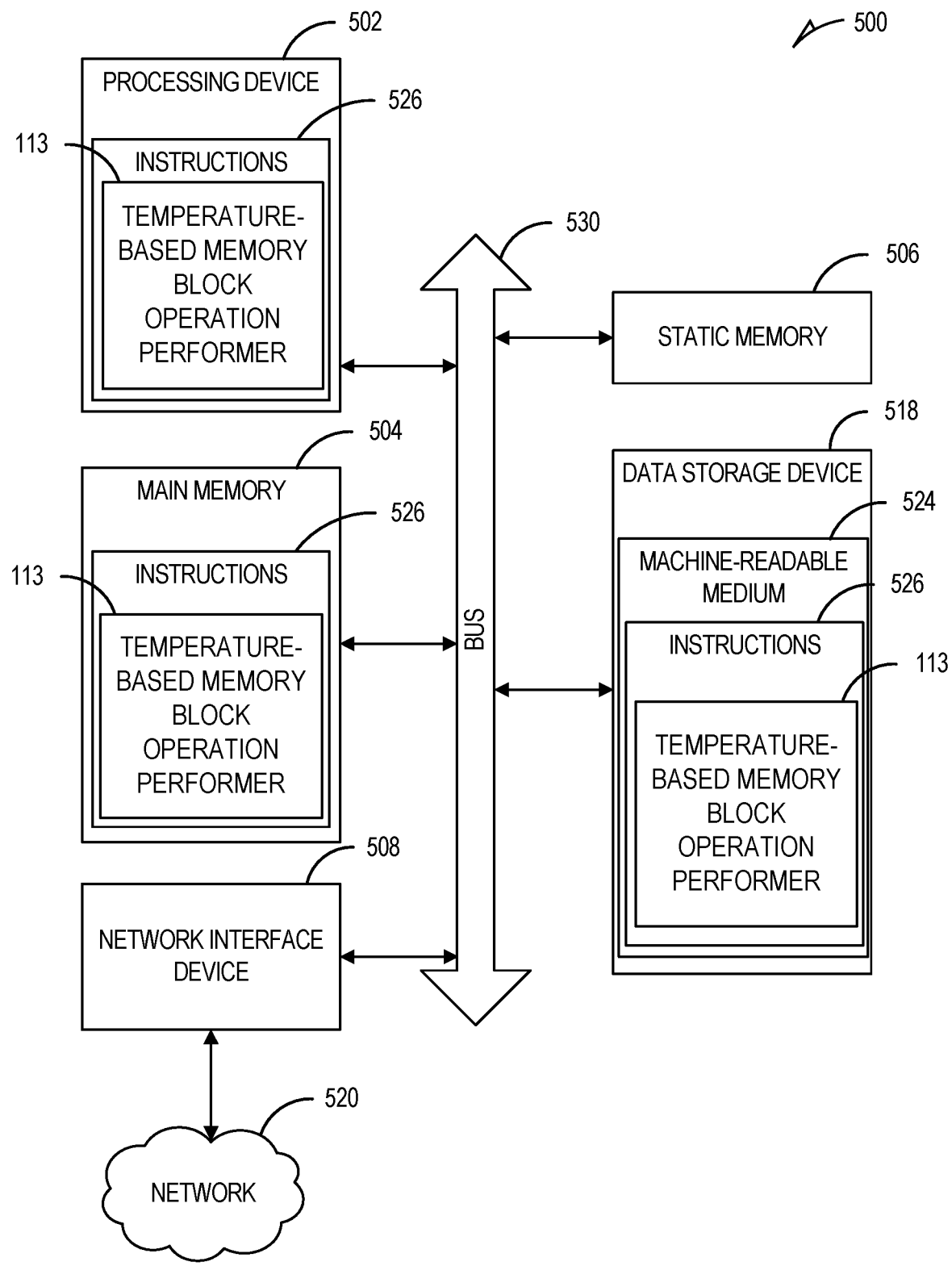
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Though both the main memory 504 and the data storage device 518 are illustrated as part of the computer system 500, it will be understood that the computer system 500 a computer system of an embodiment can include either the main memory 504, the data storage device 518, or both.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application-specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage device 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502, also constituting machine-readable storage media. The machine-readable storage medium 524, data storage device 518, and/or main memory 504 can correspond to the memory sub-system 110 of FIG. 1.

In one embodiment, the instructions 526 include instructions to implement functionality corresponding to performing a memory operation based on a temperature associated with a block of a memory device as described herein (e.g., the temperature-based memory block operation performer 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of blocks that comprise at least one cache block and at least one non-cache block; and
a processing device, operatively coupled to the memory device, configured to perform operations comprising:
receiving, from a host system, a request to write host data;
writing the host data to the at least one cache block;
while at least a portion of the host data is being written to the at least one cache block, determining a sample physical temperature associated with the at least one cache block;
determining to perform block compaction operation on the at least one cache block, the block compaction operation comprising copying stored data from the at least one cache block to the at least one non-cache block; and
prior to performing the block compaction operation on the at least one cache block:
determining whether the sample physical temperature is above a temperature threshold value; and
performing the block compaction operation on the at least one cache block based on the determining of whether the sample physical temperature is above the temperature threshold value.

2. The system of claim 1, wherein the at least one cache block comprises a single-level cell (SLC) block.

3. The system of claim 1, wherein the at least one non-cache block comprises a quad-level cell (QLC) block.

4. The system of claim 1, wherein the performing of the block compaction operation on the at least one cache block based on the determining of whether the sample physical temperature is above the temperature threshold value comprises:
in response to determining that the sample physical temperature is above the temperature threshold value, performing the block compaction operation on at least one cache block.

5. The system of claim 1, wherein the performing of the block compaction operation on the at least one cache block based on the determining of whether the sample physical temperature is above the temperature threshold value comprises:
in response to determining that the sample physical temperature is not above the temperature threshold value:

determining whether to defer performance of the block compaction operation on the at least one cache block; and in response to determining to not defer performance of the block compaction operation on the at least one cache block:

performing the block compaction operation on the at least one cache block; and marking the at least one non-cache block for performance of a block folding operation at least at or above a predetermined physical temperature.

6. The system of claim 5, wherein the determining of whether to defer performance of the block compaction operation on the at least one cache block comprises:

determining whether cache blocks of the memory device satisfy a full cache criterion that indicates that the cache blocks are full; and in response to the full cache criterion being satisfied, determining to not defer performance of the block compaction operation on the at least one cache block.

7. The system of claim 5, comprising:

determining whether the at least one non-cache block is marked for the block folding operation to be performed at or above the predetermined physical temperature; and performing the block folding operation on the at least one non-cache block based on the determining of whether the at least one non-cache block is marked.

8. The system of claim 5, comprising:

determining whether the at least one non-cache block is marked for the block folding operation at least at or above the predetermined physical temperature and the at least one non-cache block satisfies a read bit error rate (RBER)-based criterion; and in response to determining that the at least one non-cache block is marked and the at least one non-cache block satisfies the RBER-based criterion, performing the block folding operation on the at least one non-cache block at least at or above the predetermined physical temperature.

9. The system of claim 8, wherein the RBER-based criterion comprises a criterion that indicates that the at least one non-cache block is failing when the criterion is satisfied.

10. The system of claim 5, wherein the predetermined physical temperature is equal to or greater than the temperature threshold value.

11. The system of claim 5, wherein the marking of the at least one non-cache block for performance of the block folding operation at least at or above the predetermined physical temperature comprises:

determining a compaction temperature at which the block compaction operation on the at least one non-cache block is performed; and storing information describing the compaction temperature with respect to the at least one non-cache block.

12. The system of claim 1, wherein the block compaction operation comprises a single-level cell-quad-level cell (SLC-QLC) compaction operation.

13. The system of claim 1, wherein the temperature threshold value is generated based on a set of known information for the memory device, the set of known information comprising a set of operating characteristics of the memory device.

14. The system of claim 1, wherein the operations comprise:

monitoring a set of current operating characteristics of the memory device; and updating the temperature threshold value based on the set of current operating characteristics.

15. At least one non-transitory machine-readable storage medium comprising instructions that, when executed by a processing device, cause the processing device to perform operations comprising:

receiving, from a host system, a request to write host data on a memory sub-system, the memory sub-system comprising a memory device;

while at least a portion of the host data is being written to at least one cache block of a memory device, determining a sample physical temperature associated with the at least one cache block;

determining to perform a block compaction operation on the at least one cache block, the block compaction operation comprising copying stored data from the at least one cache block to at least one non-cache block of the memory device; and prior to performing the block compaction operation on the at least one cache block:

determining whether the sample physical temperature is above a temperature threshold value; and performing the block compaction operation on the at least one cache block based on the determining of whether the sample physical temperature is above the temperature threshold value.

16. The at least one non-transitory machine-readable storage medium of claim 15, wherein the at least one cache block comprises a single-level cell (SLC) block.

17. The at least one non-transitory machine-readable storage medium of claim 15, wherein the at least one non-cache block comprises a quad-level cell (QLC) block.

18. The at least one non-transitory machine-readable storage medium of claim 15, wherein the performing of the block compaction operation on the at least one cache block based on the determining of whether the sample physical temperature is above the temperature threshold value comprises:

in response to determining that the sample physical temperature is above the temperature threshold value, performing the block compaction operation on the at least one cache block.

19. The at least one non-transitory machine-readable storage medium of claim 15, wherein the performing of the block compaction operation on the at least one cache block based on the determining of whether the sample physical temperature is above the temperature threshold value comprises:

in response to determining that the sample physical temperature is not above the temperature threshold value:

determining whether to defer performance of the block compaction operation on the at least one cache block; and in response to determining to not defer performance of the block compaction operation on the at least one cache block:

performing the block compaction operation on the at least one cache block; and marking the at least one non-cache block for performance of a block folding operation at least at or above a predetermined physical temperature.

20. A method comprising:

receiving, from a host system, a request to write host data on a memory sub-system, the memory sub-system comprising a memory device;

while at least a portion of the host data is being written to at least one cache block of a memory device, determining a sample physical temperature associated with the at least one cache block;

determining to perform block compaction operation on the at least one cache block, the block compaction operation comprising copying stored data from the at least one cache block to at least one non-cache block of the memory device; and prior to performing the block compaction operation on the at least one cache block:

determining whether the sample physical temperature is above a temperature threshold value; and performing the block compaction operation on the at least one cache block based on the determining of whether the sample physical temperature is above the temperature threshold value.

* * * * *